United States Patent
Lin (10) Patent No.: US 9,563,249 B2
(45) Date of Patent: Feb. 7, 2017

(54) DATA STORAGE DEVICE AND POWER-INTERRUPTION DETECTION METHOD

(71) Applicant: Silicon Motion, Inc., Jhubei (TW)

(72) Inventor: Wen-Sheng Lin, Kaohsiung (TW)

(73) Assignee: Silicon Motion, Inc., Jhubei (TW)

( * ) Notice: Subject to any disclaimer, the term of this patent is extended or adjusted under 35 U.S.C. 154(b) by 0 days.

(21) Appl. No.: 15/009,231

(22) Filed: Jan. 28, 2016

(65) Prior Publication Data

US 2016/0224089 A1    Aug. 4, 2016

(30) Foreign Application Priority Data

Feb. 2, 2015 (TW) .............................. 104103384 A (51) Int. Cl.
*G06F 1/30* (2006.01)
*G06F 11/22* (2006.01)
*G06F 12/02* (2006.01)

(52) U.S. Cl.
CPC ............. *G06F 1/30* (2013.01); *G06F 11/2284* (2013.01); *G06F 12/0246* (2013.01); *G06F 2212/2022* (2013.01)

(58) Field of Classification Search
CPC .... G06F 1/30; G06F 11/2284; G06F 12/0246; G06F 2212/2022
See application file for complete search history.

(56) References Cited

U.S. PATENT DOCUMENTS

| | | | |
|---|---|---|---|
| 6,170,066 B1 | 1/2001 | See | |
| 2011/0128785 A1 | 6/2011 | Seo | |
| 2011/0283051 A1* | 11/2011 | Lieber | G06F 11/1417 711/103 |
| 2012/0266006 A1* | 10/2012 | Chen | G06F 11/2284 713/340 |
| 2014/0040535 A1* | 2/2014 | Lee | G06F 12/0246 711/103 |
| 2015/0095558 A1* | 4/2015 | Kim | G06F 12/0246 711/103 |
| 2015/0347291 A1* | 12/2015 | Choi | G06F 12/0246 711/103 |

FOREIGN PATENT DOCUMENTS

| | | |
|---|---|---|
| TW | 200929238 A | 7/2009 |
| TW | I322271 B | 3/2010 |

OTHER PUBLICATIONS

Office Action of corresponding TW application, published on Apr. 1, 2016.

* cited by examiner

*Primary Examiner* — Richard Elms
*Assistant Examiner* — Ajay Ojha
(74) *Attorney, Agent, or Firm* — Wang Law Firm, Inc.

(57) ABSTRACT

A data storage device includes a flash memory and a controller device. The flash memory includes a plurality of pages, wherein each of the pages includes a spare area, and each of the spare areas stores a power-off-reset count. The controller device determines whether the first page has been through a power-interruption event according to the power-off-reset counts stored in the spare areas.

11 Claims, 7 Drawing Sheets

| | | |
|---|---|---|
| P1 | page | PORC1=2 — SPA1 |
| P2 | page | PORC2=2 — SPA2 |
| P3 | page | PORC3=2 — SPA3 |
| P4 | page | PORC4=3 — SPA4 |
| P5 | page | PORC5=3 — SPA5 |
| P6 | page | PORC6=3 — SPA6 |

FIG. 3

| | | |
|---|---|---|
| P1 | page | PORC1=2 — SPA1 |
| P2 | page | PORC2=2 — SPA2 |
| P3 | page | PORC3=2 — SPA3 |
| P4 | page | PORC4=2 — SPA4 |
| P5 | page | PORC5=2 — SPA5 |
| P6 | page | PORC6=2 — SPA6 |

| | | |
|---|---|---|
| P1 | page | PORC1=2 — SPA1 |
| P2 | page | PORC2=2 — SPA2 |
| P3 | page | PORC3=2 — SPA3 |
| P4 | UECC | |
| P5 | page | PORC5=3 — SPA5 |
| P6 | page | PORC6=3 — SPA6 |

FIG. 6

| | | |
|---|---|---|
| P1 | page | PORC1=2 — SPA1 |
| P2 | page | PORC2=2 — SPA2 |
| P3 | page | PORC3=2 — SPA3 |
| P4 | UECC | — SPA4 |
| P5 | page | PORC5=2 — SPA5 |
| P6 | page | PORC6=2 — SPA6 |

DATA STORAGE DEVICE AND POWER-INTERRUPTION DETECTION METHOD

CROSS REFERENCE TO RELATED APPLICATIONS

This Application claims priority of Taiwan Patent Application No. 104103384, filed on Feb. 2, 2015, the entirety of which is incorporated by reference herein.

BACKGROUND OF THE INVENTION

Field of the Invention

The present invention relates to a data-storage device and in particular to a data-storage device capable of determining whether the page has been through a power-interruption event.

Description of the Related Art

Flash memory is considered a non-volatile data-storage device, using electrical methods to erase and program itself. NAND Flash, for example, is often used in memory cards, USB flash devices, solid state devices, eMMCs, and other memory devices.

Flash memory such as NAND Flash uses a multiple-block structure to store data, wherein the flash memory is constructed by floating gate transistors. The floating gates of a floating gate transistor may catch electronic charges for storing data. However, the floating gates may lose the electronic charges due to various operations and the various environmental parameters of the flash memory, which can lead to read and write errors. Moreover, unstable power can also lead to read and write errors.

BRIEF SUMMARY OF THE INVENTION

A detailed description is given in the following embodiments with reference to the accompanying drawings.

The present invention provides a data storage device. The data storage device includes a flash memory and a controller device. The flash memory includes a plurality of pages, wherein each of the pages includes a spare area, and each of the spare areas stores a power-off-reset count. The controller device determines whether a first page of the pages has been through a power-interruption event according to the power-off-reset counts stored in the spare areas.

The present invention further provides a power-interruption detection method applied to a data storage device of a flash memory, wherein the flash memory includes a plurality of pages, and each of the pages includes a spare area. The power-interruption detection method includes: writing a reference power-off-reset count into each of the spare areas of the pages which underwent a write process for using the reference power-off-reset count as the power-off-reset count of each of the pages when the pages undergo a write process; and determining whether a first of the pages has been through a power-interruption event according to the power-off-reset counts stored in the spare areas of the pages.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
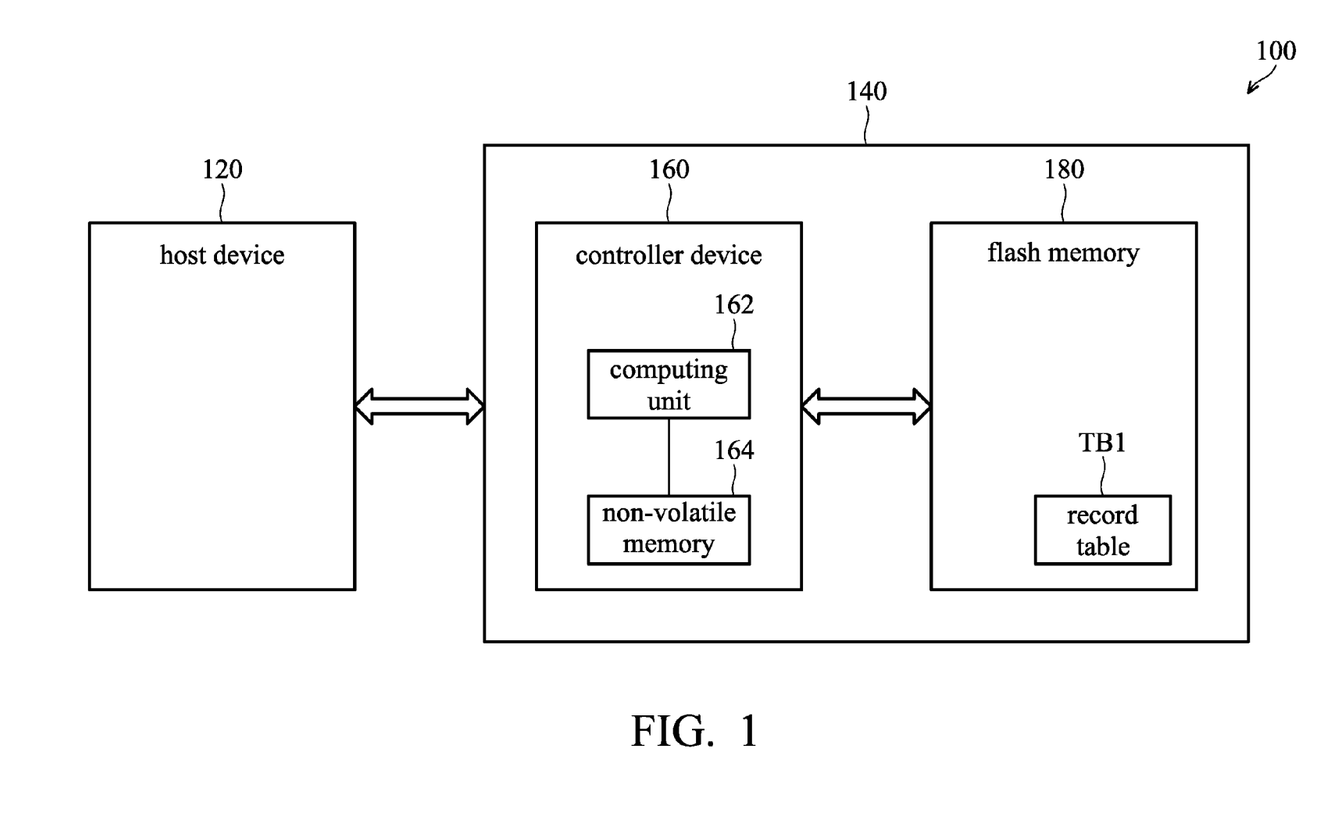
FIG. 1 is a schematic diagram illustrating an embodiment of an electronic system of the present invention.
Figure 2:
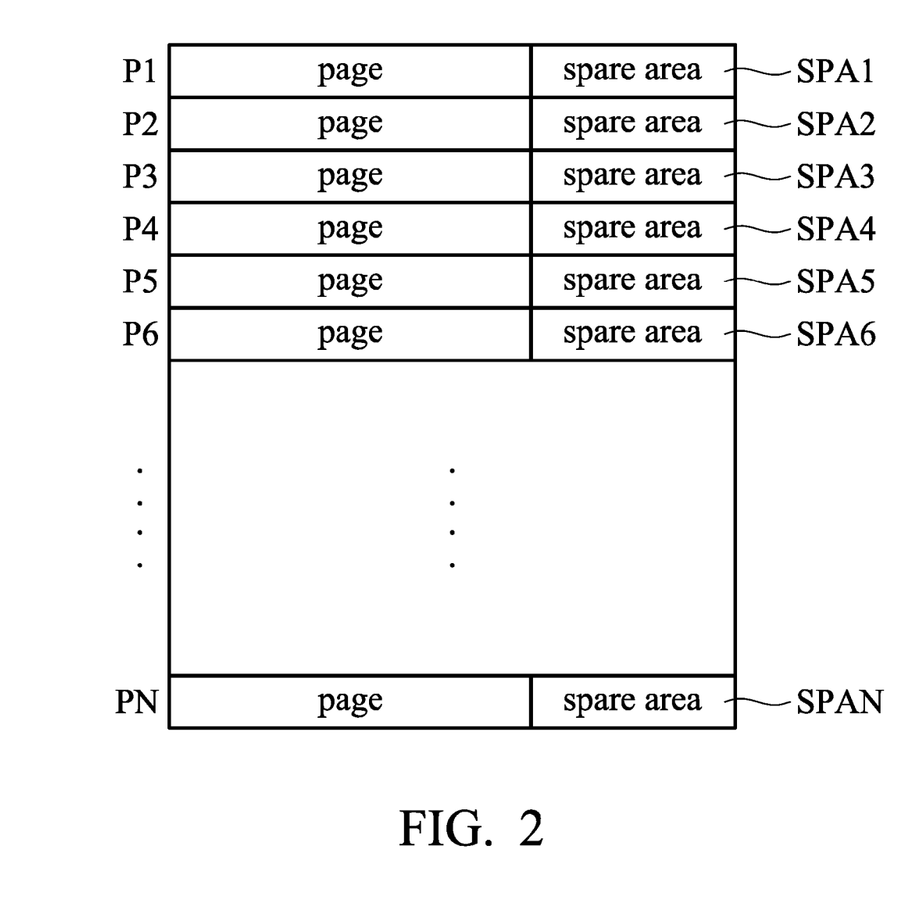
FIG. 2 is a schematic diagram illustrating an embodiment of a flash memory of the present invention.

FIG. 1 is a schematic diagram illustrating an embodiment of an electronic system of the present invention. The electronic system 100 includes a host device 120 and a data storage device 140. The data-storage device 140 includes a flash memory 180 and a controller 160 arranged to operate in response to the commands of the host 110. The controller device 160 includes a computing unit 162, a random access memory 166 (RAM) and a non-volatile memory, such as read only memory 164 (ROM). The non-volatile memory 164, the program code stored in the non-volatile memory 164 and data stored in the non-volatile memory 164 constitute firmware executed by the processing unit 162, and the controller 160 is configured to control the flash memory 180 based on the firmware. The firmware is arranged to be loaded in the random access memory 166 to be executed by the controller 160. The flash memory 180 includes a plurality of pages P1~PN, wherein each of pages P1~PN has a spare area SPA1~SPAN, as shown in FIG. 2. In one embodiment, the flash memory 180 includes a plurality of blocks, and each of the blocks has a plurality of pages, wherein flash memory 180 erases data by units of blocks, and is only able to access the data by units of pages, and writes data by units of pages.

It should be noted that, in one embodiment, each of the spare areas SPA1~SPAN includes a power-off-reset count (POR Count). The flash memory 180 further stores a record table TB1 arranged to record a reference power-off-reset count, wherein the controller device 160 is configured to increase the reference power-off-reset count by one every time that the data storage device 140 is powered off. Moreover, when the controller device 160 performs a write process on at least one target page, the controller device 160 writes the reference power-off-reset count of the record table TB1 into the spare area of the target page to use the reference power-off-reset count as the power-off-reset count of the target page, but it is not limited thereto. In one embodiment, the controller device 160 adds one to the reference power-off-reset count when the data storage device 140 is restarted after a power-off, but it is not limited thereto. It should be noted that, in one embodiment, a power-off includes a normal power off (shutdown) and an abnormal power off, but it is not limited thereto. In another embodiment, a power-off only includes an abnormal power off. For example, when the reference power-off-reset count stored in the record table TB1 is 2 and the controller device 160 is performing a write process on the page P1, the controller device 160 writes the reference power-off-reset count "2" which is stored in the record table TB1 into the spare area SPA1 of the page P1 to use "2" as the power-off-reset count (POR Count) of the page P1. In other embodiments, the power-off-reset counts of the pages can also be recorded by increasing the original power-off-reset counts rather than using the reference power-off-reset count of the record table TB1.

Moreover, the controller device 160 is configured to determine whether a first page of the pages P1~PN has been through a power-interruption event according to the power-off-reset counts stored in the spare areas SPA1~SPAN of the pages P1~PN. In one embodiment, the first page is a page that cannot be successfully read by the controller device 160, but it is not limited thereto. The first page can also be any of the pages of the flash memory 180. For example, when the controller device 160 cannot successfully read the page P4 of the pages P1~P30 in response to the command of the host device 120 or the internal command of the controller device 160 which indicates reading the pages P1~P30 of the flash memory 180, the controller device 160 determines whether the page P4 has been through a power-interruption event according to the power-off-reset counts stored in the spare areas SPA1~SPAN of the pages P1~PN, but it is not limited thereto. It should be noted that the controller device 160 cannot successfully read the page when the error bits of the page are more than a predetermined correctable value and the pages cannot be corrected by error correction.

Figure 3:
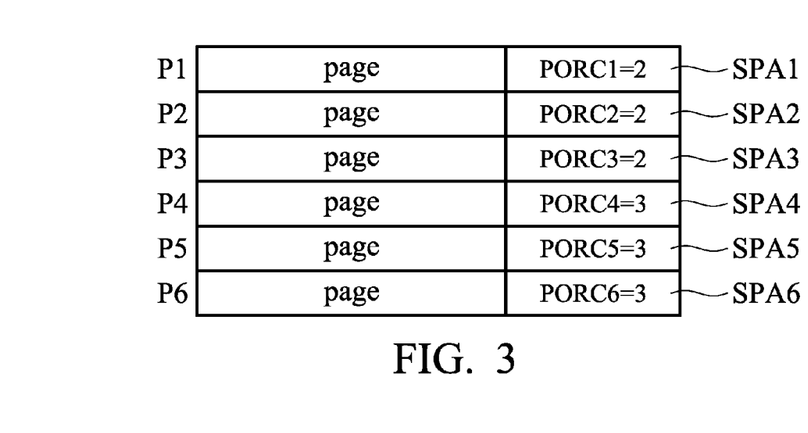
FIG. 3 is a schematic diagram illustrating another embodiment of a flash memory of the present invention.
Figure 4:
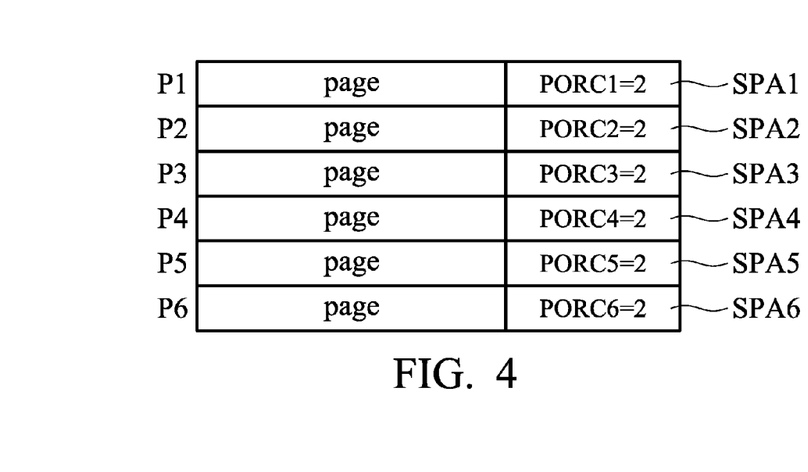
FIG. 4 is a schematic diagram illustrating another embodiment of a flash memory of the present invention.

In this embodiment, the controller device 160 reads the power-off-reset count of the first page and the power-off-reset count of a second page which is adjacent to and in front of the first page and compares the power-off-reset count of the first page and the power-off-reset count of the second page, wherein the controller device 160 determines that the first page has been through a power-interruption event when the power-off-reset count of the first page is different from the power-off-reset count of the second page, but it is not limited thereto. For example, the first page is the page P4, as shown in FIG. 3. The controller device 160 reads the power-off-reset count PORC4 of the page P4 and the power-off-reset count PORC3 of the page P3 which is adjacent to and in front of the page P4, and compares the power-off-reset count PORC4 of the page P4 with the power-off-reset count PORC3 of the page P3. In this embodiment, the power-off-reset count PORC4 of the page P4 is 3, and the power-off-reset count PORC3 of the page P3 is 2. The power-off-reset count PORC4 and the power-off-reset count PORC3 are different, such that the controller device 160 determines that the page P4 has been through a power-interruption event. Another example would be the first page being the page P4, as shown in FIG. 4. The controller device 160 reads the power-off-reset count PORC4 of the page P4 and the power-off-reset count PORC3 of the page P3 which is adjacent to and in front of the page P4, and compares the power-off-reset count PORC4 of the page P4 with the power-off-reset count PORC3 of the page P3. In this embodiment, the power-off-reset count PORC4 of the page P4 is 2, and the power-off-reset count PORC3 of the page P3 is 2. The power-off-reset count PORC4 and the power-off-reset count PORC3 are the same, such that the controller device 160 determines that the page P4 has not been through a power-interruption event.

Figure 5:
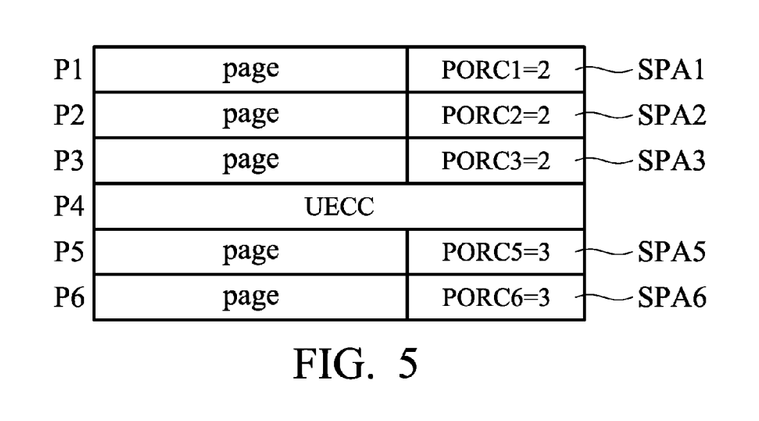
FIG. 5 is a schematic diagram illustrating another embodiment of a flash memory of the present invention.
Figure 6:
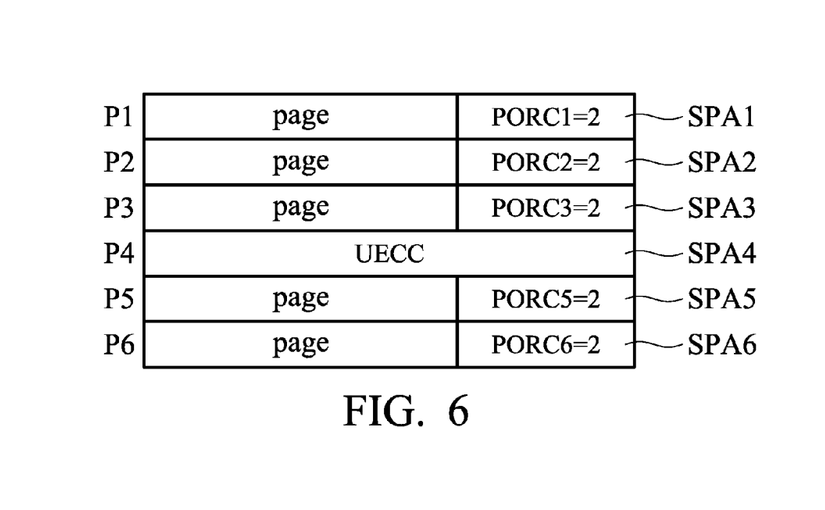
FIG. 6 is a schematic diagram illustrating another embodiment of a flash memory of the present invention.

In another embodiment, the controller device 160 is configured to read the power-off-reset counts of a second page and a third page which are both adjacent to the first page, and compares the power-off-reset count of the second page with the power-off-reset count of the third page, wherein the controller device 160 determines that the page P4 has been through a power-interruption event when the power-off-reset count of the second page is different from the power-off-reset count of the third page. For example, in this embodiment, the first page is a page UECC which cannot be successfully read by the controller device 160, and the page UECC which cannot be successfully read by the controller device 160 is the page P4, as shown in FIG. 5. The controller device 160 is configured to read the power-off-reset count PORC3 of the page P3 and the power-off-reset count PORC5 of the page P5 which are both adjacent to the page P4, and compares the power-off-reset count PORC3 of the page P3 with the power-off-reset count PORC5 of the page P5. In this embodiment, the power-off-reset count PORC3 of the page P3 is 2, and the power-off-reset count PORC5 of the page P5 is 3. The power-off-reset count PORC3 of the page P3 and the power-off-reset count PORC5 of the page P5 are different, such that the controller device 160 determines that the page P4 has been through a power-interruption event. Another example in this embodiment would be the first page being the page UECC which cannot be successfully read by the controller device 160, and the page UECC which cannot be read by the controller device 160 is the page P4, as shown in FIG. 6. The controller device 160 is configured to read the power-off-reset count PORC3 of the page P3 and the power-off-reset count PORC5 of the page P5 which are both adjacent to the page P4, and compares the power-off-reset count PORC3 of the page P3 with the power-off-reset count PORC5 of the page P5. In this embodiment, the power-off-reset count PORC3 of the page P3 is 2, and the power-off-reset count PORC5 of the page P5 is 2. The power-off-reset count PORC3 of the page P3 and the power-off-reset count PORC5 of the page P5 are the same, such that the controller device 160 determines that the page P4 has not been through a power-interruption event.

Figure 7:
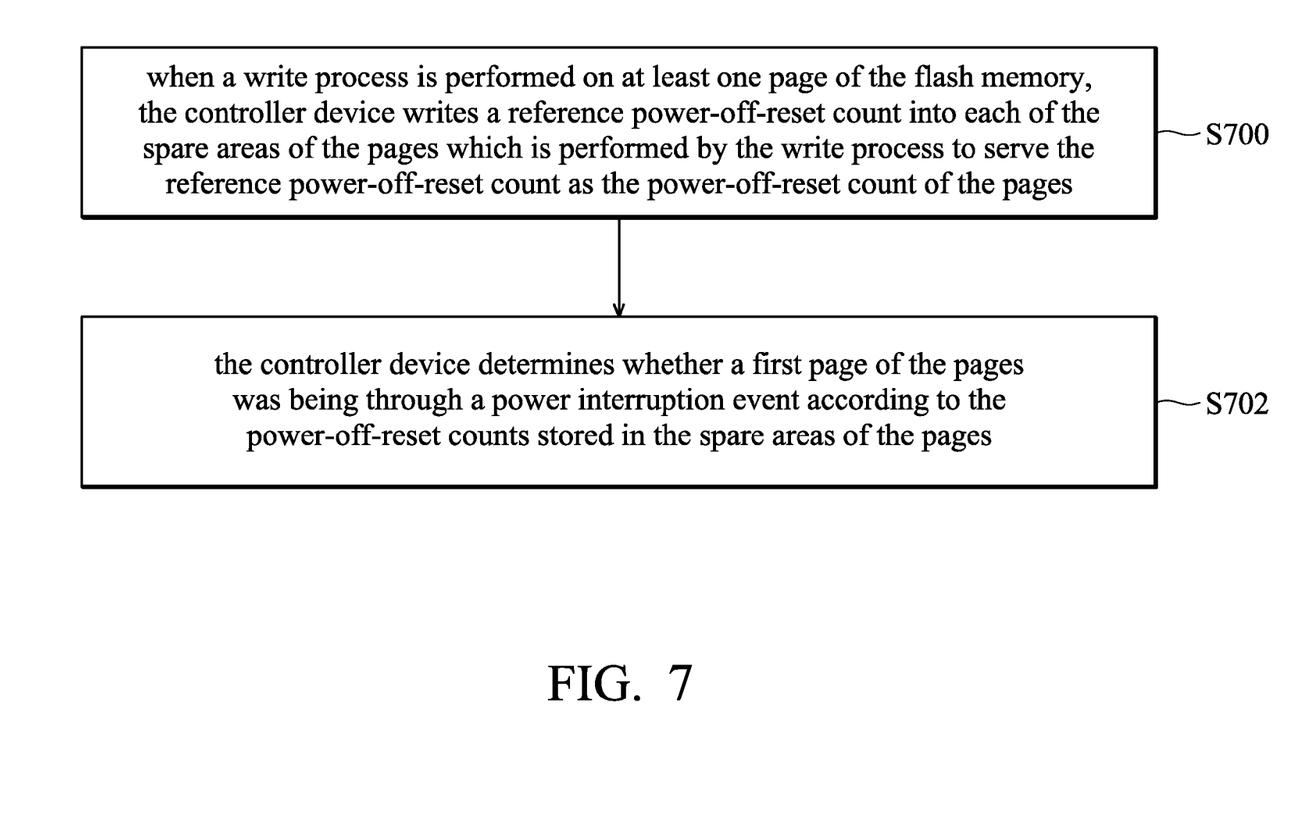
FIG. 7 is a flowchart of a power-interruption detection method according to an embodiment of the present invention.

FIG. 7 is a flowchart of a power-interruption detection method according to an embodiment of the present invention. The power-interruption detection method is applied to the data storage device 140 of FIG. 1. The process starts at step S700.

In step S700, when a write process is performed on at least one page of the flash memory 180, the controller device 160 writes a reference power-off-reset count into each of the spare areas of the pages which underwent the write process to use the reference power-off-reset count as the power-off-reset count of the pages. For example, when the reference power-off-reset count stored in the record table TB1 is 2 and the controller device 160 is performing a write process on the page P1, the controller device 160 writes the reference power-off-reset count "2" which is stored in the record table TB1 into the spare area SPA1 of the page P1 to serve "2" as the power-off-reset count (POR Count) of the page P1. In one embodiment, the power-interruption detection method further includes adding one to the reference power-off-reset count every time the data storage device 140 is powered off.

Next, in step S702, the controller device 160 determines whether a first page of the pages P1~PN has been through a power-interruption event according to the power-off-reset counts stored in the spare areas SPA1~SPAN of the pages P1~PN. In one embodiment, the first page is a page which cannot be successfully read by the controller device 160, but it is not limited thereto. The first page can also be any of the pages of the flash memory 180. The process ends at step S702.

Figure 8:
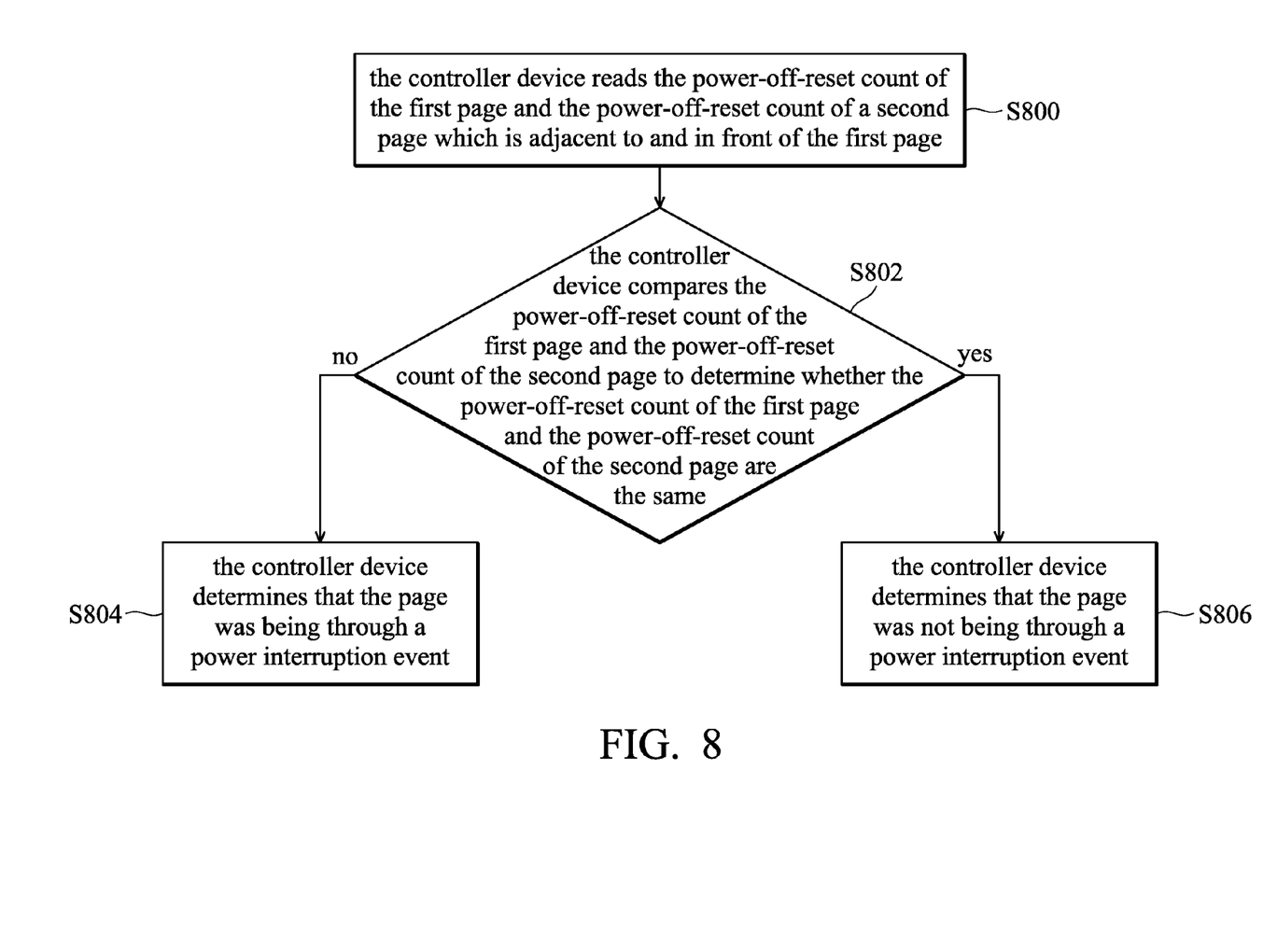
FIG. 8 is a flowchart of a comparison method of the power-interruption detection method according to an embodiment of the present invention.

FIG. 8 is a flowchart of a comparison method of the power-interruption detection method according to an embodiment of the present invention. The comparison method is applied to the data storage device 140 of FIG. 1, and the comparison method is the detailed description of step S720 of FIG. 7. The process starts at step S800.

In step S800, the controller device 160 reads the power-off-reset count of the first page and the power-off-reset count of a second page which is adjacent to and in front of the first page. For example, For example, the first page is the page P4, as shown in FIG. 3 and FIG. 4. The controller device 160 reads the power-off-reset count PORC4 of the page P4 and the power-off-reset count PORC3 of the page P3 which is adjacent to and in front of the page P4, but it is not limited thereto.

Next, in step S802, the controller device 160 compares the power-off-reset count of the first page and the power-off-reset count of the second page to determine whether the power-off-reset count of the first page and the power-off-reset count of the second page are the same. When the power-off-reset count of the first page and the power-off-reset count of the second page are different, the process goes to step S804. When the power-off-reset count of the first page and the power-off-reset count of the second page are the same, the process goes to step S806. For example, the first page is the page P4, as shown in FIG. 3 and FIG. 4. The controller device 160 compares the power-off-reset count PORC4 of the page P4 with the power-off-reset count PORC3 of the page P3. In the embodiment of FIG. 3, the power-off-reset count PORC4 of the page P4 is 3, and the power-off-reset count PORC3 of the page P3 is 2. The power-off-reset count PORC4 and the power-off-reset count PORC3 are different, such that the process goes to step S804. In the embodiment of FIG. 4, the power-off-reset count PORC4 of the page P4 is 2, and the power-off-reset count PORC3 of the page P3 is 2. The power-off-reset count PORC4 and the power-off-reset count PORC3 are the same, such that the process goes to step S806.

In step S804, the controller device 160 determines that the page P4 has been through a power-interruption event. The process ends at step S804.

In step S806, the controller device 160 determines that the page P4 has not been through a power-interruption event. The process ends at step S806.

Figure 9:
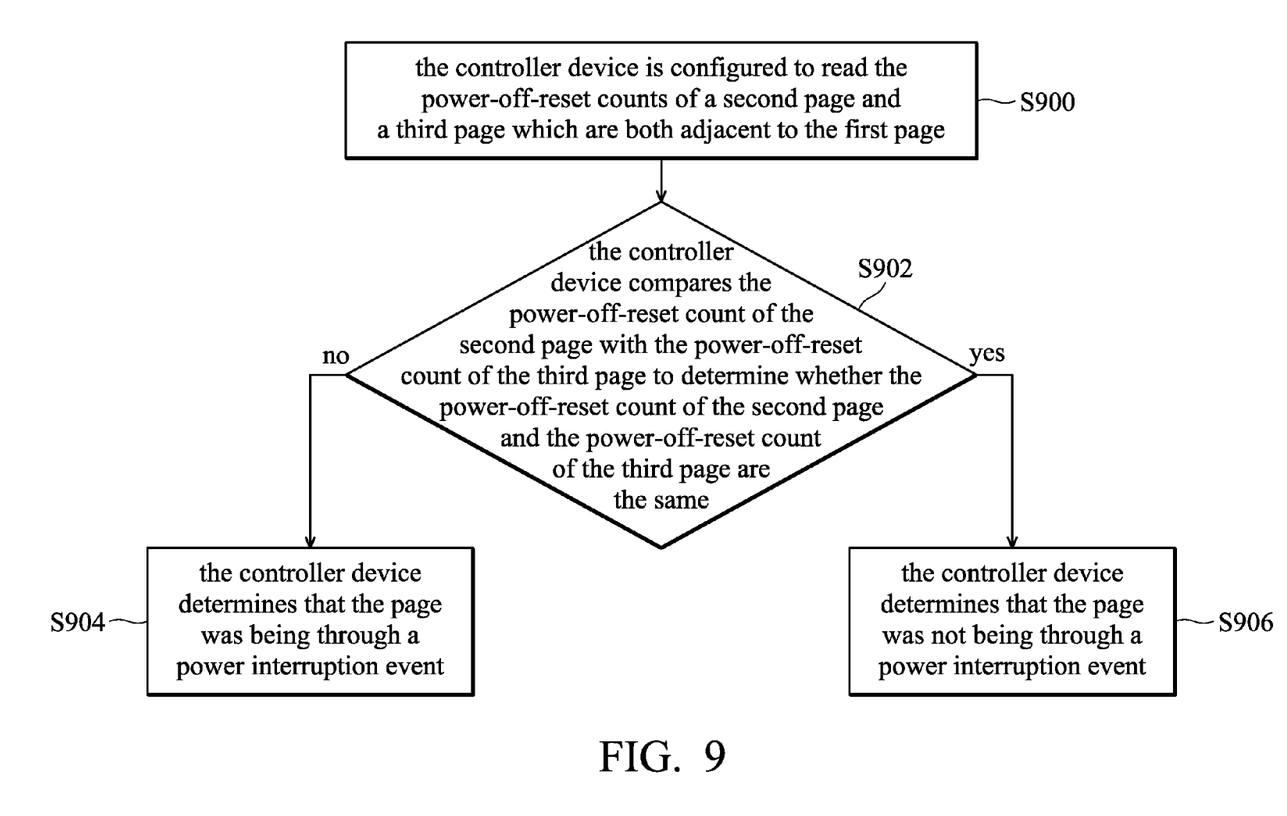
FIG. 9 is a flowchart of a comparison method of the power-interruption detection method according to another embodiment of the present invention.

FIG. 9 is a flowchart of a comparison method of the power-interruption detection method according to another embodiment of the present invention. The comparison method is applied to the data storage device 140 of FIG. 1, and the comparison method is the detailed description of step S720 of FIG. 7. The process starts at step S900.

In step S900, the controller device 160 is configured to read the power-off-reset counts of a second page and a third page which are both adjacent to the first page. For example, the first page is a page UECC which cannot be successfully read by the controller device 160, and the page UECC which cannot be successfully read by the controller device 160 is the page P4, as shown in FIG. 5 and FIG. 6. The controller device 160 is configured to read the power-off-reset count PORC3 of the page P3 and the power-off-reset count PORC5 of the page P5 which both are adjacent to the page P4.

Next, in step S902, the controller device 160 compares the power-off-reset count of the second page with the power-off-reset count of the third page to determine whether the power-off-reset count of the second page and the power-off-reset count of the third page are the same. When the power-off-reset count of the second page and the power-off-reset count of the third page are different, the process goes to step S904. When the power-off-reset count of the second page and the power-off-reset count of the third page are the same, the process goes to step S906. For example, in this embodiment, the first page is a page UECC which cannot be successfully read by the controller device 160, and the page UECC which cannot be successfully read by the controller device 160 is the page P4, as shown in FIG. 5 and FIG. 6. The controller device 160 compares the power-off-reset count PORC3 of the page P3 with the power-off-reset count PORC5 of the page P5. In the embodiment of FIG. 4, the power-off-reset count PORC3 of the page P3 is 2, and the power-off-reset count PORC5 of the page P5 is 3. The power-off-reset count PORC3 of the page P3 and the power-off-reset count PORC5 of the page P5 are different, such that the process goes to step S904. In the embodiment of FIG. 5, the power-off-reset count PORC3 of the page P3 is 2, and the power-off-reset count PORC5 of the page P5 is 2. The power-off-reset count PORC3 of the page P3 and the power-off-reset count PORC5 of the page P5 are the same, such that the process goes to step S906.

In step S904, the controller device 160 determines that the page PP4 has been through a power-interruption event. The process ends at step S904.

In step S906, the controller device 160 determines that the page P4 has not been through a power-interruption event. The process ends at step S906.

Data transmission methods, or certain aspects or portions thereof, may take the form of program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby becomes an apparatus for practicing the methods. The methods may also be embodied in the form of program code transmitted over some transmission medium, such as electrical wiring or cabling, through fiber optics, or via any other form of transmission, wherein, when the program code is received and loaded into and executed by a machine such as a computer, the machine becomes an apparatus for practicing the disclosed methods. When implemented on a general-purpose processor, the program code combines with the processor to provide a unique apparatus that operates analogously to application-specific logic circuits.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:
1. A data storage device, comprising:
a flash memory, comprising a plurality of pages, wherein each of the pages comprises a spare area, and each of the spare areas stores a power-off-reset count; and a controller device, determining whether a first page of the pages has been through a power-interruption event by comparing two of the power-off-reset counts stored in the spare areas.

2. The data storage device as claimed in claim 1, wherein the flash memory further comprises a record table arranged to record a reference power-off-reset count, wherein the controller device increases the reference power-off-reset count by one every time the data storage device is powered off.

3. The data storage device as claimed in claim 2, wherein the controller device writes the reference power-off-reset count of the record table into the spare area of at least one target page of the pages for using the reference power-off-reset count as the power-off-reset count of the target page when the controller device performs a write process on the target page of the page.

4. The data storage device as claimed in claim 1, wherein the controller device reads the power-off-reset count of the first page and the power-off-reset count of a second page which is adjacent to and in front of the first page, and compares the power-off-reset count of the first page with the power-off-reset count of the second page, wherein the controller device determines that the first page has been through a power-interruption event when the power-off-reset count of the first page is different from the power-off-reset count of the second page.

5. The data storage device as claimed in claim 1, wherein the controller device reads the power-off-reset counts of a second page and a third page which are adjacent to the first page, and compares the power-off-reset count of the second page with the power-off-reset count of the third page, wherein the controller device determines that the first page has been through a power-interruption event when the power-off-reset count of the second page is different from the third page.

6. The data storage device as claimed in claim 1, wherein the first page is a page that cannot be successfully read by the controller device.

7. A power-interruption detection method, applied to a data storage device of a flash memory, wherein the flash memory comprises a plurality of pages, each of the pages comprises a spare area, and the power-interruption detection method comprises:
    writing a reference power-off-reset count into each of the spare areas of the pages which underwent a write process for using the reference power-off-reset count as a power-off-reset count of each of the pages when the pages undergo a write process; and
    determining whether a first page has been through a power-interruption event by comparing two of the power-off-reset counts stored in the spare areas.

8. The power-interruption detection method as claimed in claim 7, further comprising increasing the reference power-off-reset count by one every time the data storage device is powered off.

9. The power-interruption detection method as claimed in claim 7, further comprising:
    reading the power-off-reset count of the first page and the power-off-reset count of a second page which is adjacent to and in front of the first page;
    comparing the power-off-reset count of the first page with the power-off-reset count of the second page; and
    determining that the first page has been through a power-interruption event when the power-off-reset count of the first page is different from the power-off-reset count of the second page.

10. The power-interruption detection method as claimed in claim 7, further comprising:
    reading the power-off-reset counts of a second page and a third page which are adjacent to the first page;
    comparing the power-off-reset count of the second page with the power-off-reset count of the third page; and
    determining that the first page has been through a power-interruption event when the power-off-reset count of the second page is different from the third page.

11. The power-interruption detection method as claimed in claim 7, wherein the first page is a page that cannot be successfully read.

* * * * *